US011587496B1

(12) United States Patent
Cai

(10) Patent No.: US 11,587,496 B1
(45) Date of Patent: Feb. 21, 2023

(54) PROCESSING METHOD AND DEVICE

(71) Applicant: Lenovo (Beijing) Limited, Beijing (CN)

(72) Inventor: Jianhui Cai, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/681,259

(22) Filed: Feb. 25, 2022

(30) Foreign Application Priority Data

Sep. 29, 2021 (CN) .......................... 202111150033.0

(51) Int. Cl.
 *G09G 3/20* (2006.01)
 *G06F 3/14* (2006.01)
(52) U.S. Cl.
 CPC .......... *G09G 3/2092* (2013.01); *G06F 3/1423* (2013.01); *G09G 2340/0435* (2013.01)
(58) Field of Classification Search
 CPC ........ G06F 3/14; G06F 3/1423; G06F 19/327; G09G 2330/021; G09G 2330/022; H04N 21/2665; H04N 21/4314; H04N 21/4347
 See application file for complete search history.

(56) References Cited

U.S. PATENT DOCUMENTS

| 2003/0077561 | A1* | 4/2003 | Alsop | H04L 67/131 434/408 |
| 2006/0285077 | A1* | 12/2006 | Miyasaka | G03B 21/26 353/30 |
| 2008/0231546 | A1* | 9/2008 | Li | G06F 3/1423 345/3.4 |
| 2009/0012821 | A1* | 1/2009 | Besson | H04N 21/4347 715/740 |

* cited by examiner

*Primary Examiner* — Shaheda A Abdin
(74) *Attorney, Agent, or Firm* — Anova Law Group PLLC

(57) ABSTRACT

Processing method and device are provided. The processing method includes obtaining a trigger instruction configured for performing output display in a screen projection mode; in response to the trigger instruction, obtaining a current refresh rate of an external display screen as a screen projection device; and in response to the current refresh rate of the external display screen exceeding a target execution set and belonging to a standard set supported by a processor, controlling processing to-be-displayed content and projecting the processed content to the screen projection device at the current refresh rate of the external display screen.

15 Claims, 4 Drawing Sheets

PROCESSING METHOD AND DEVICE

CROSS REFERENCE TO RELATED APPLICATION

The present application claims priority to Chinese Patent Application No. 202111150033.0, filed on Sep. 29, 2021, the entire content of which is incorporated herein by reference.

TECHNICAL FIELD

The present disclosure generally relates to the technical field of electronic devices, and in particular, to a processing method and a device.

BACKGROUND

Due to the performance limitations of semiconductor components (IC) in the built-in display screen of a mobile terminal (e.g., a smartphone), the highest refresh rate that can be supported by the built-in display screen of the mobile terminal is often lower than the highest refresh rate that can be supported by the processor of the mobile terminal. Therefore, the refresh rate actually used by the mobile terminal is often lower than the highest refresh rate that the processor of the mobile terminal can support. For example, the highest refresh rate supported by the processor of a mobile terminal is 144 Hz, but the actual refresh rate used by the mobile terminal is only 90 Hz, which is the highest refresh rate supported by the built-in display screen of the mobile terminal. At the same time, because an external display screen connected to an existing mobile terminal (e.g., a smartphone) can only display with one or more refresh rates provided by the built-in display screen of the existing mobile terminal, and if a user connects the existing mobile terminal to an external display screen that supports a higher refresh rate (e.g., an external display screen with a refresh rate higher than the highest refresh rate of the built-in display screen of the existing mobile terminal, e.g., a high-definition multimedia interface (HDMI) display screen that can support a refresh rate of 144 Hz), and projects the content to be displayed onto the HDMI display screen in a projection mode, then the user cannot experience the display effect of the 144 Hz high refresh rate provided by the high refresh rate HDMI display screen, and cannot use the 144 Hz refresh rate. Instead, the user can only choose a lower refresh rate (90 Hz) to match the refresh rate that the existing mobile terminal can support. As a result, an external display screen with a higher refresh rate is underused, which ultimately affects the user experience.

SUMMARY

The embodiments of the present disclosure provide a processing method and a device to solve the problem that an external display screen of a mobile terminal cannot be used in a display mode with a refresh rate higher than the current built-in refresh rate of the mobile terminal. Such problem can result in underuse of a high-end display screen, which ultimately affects the user experience.

One aspect of the present disclosure provides a processing method. The processing method includes obtaining a trigger instruction, the trigger instruction used for performing output display in a screen projection mode; in response to the trigger instruction, obtaining a current refresh rate of an external display screen, the external display screen configured as a screen projection device; and in response to the current refresh rate of the external display screen exceeding a target execution set and belonging to a standard set supported by a processor, controlling processing to-be-displayed content and projecting the processed content to the screen projection device at the current refresh rate of the external display screen.

Another aspect of the present disclosure provides a processing method. The method includes obtaining a trigger instruction configured for performing output display in a screen projection mode; in response to the trigger instruction, adding, parameter values that are in a standard set supported by a processor and do not fall into a target execution set, to the target execution set to form a temporary execution set; and responding to a screen projection of a connected external display screen according to the temporary execution set.

Another aspect of the present disclosure provides an electronic device. The electronic device includes a display screen; and a processor. The processor is configured to obtain a trigger instruction configured for performing output display in a screen projection mode; in response to the trigger instruction, obtain a current refresh rate of an external display screen, the external display screen being configured as a screen projection device; and in response to the current refresh rate exceeding a target execution set and belonging to a standard set supported by the processor, control processing to-be-displayed content and projecting the processed content to the screen projection device according to the current refresh rate.

Another aspect of the present disclosure provides an electronic device. The electronic device includes a display screen; and a processor. The processor is configured to obtain a trigger instruction configured for performing output display in a screen projection mode; in response to the trigger instruction, add, parameter values that are in a standard set supported by a processor and do not fall into a target execution set, to the target execution set to form a temporary execution set; and respond to a screen projection of a connected external display screen according to the temporary execution set.

In the processing methods and devices provided by the embodiments of the present application, when the output display is performed in the screen projection mode, the current refresh rate of the external display screen is obtained, and the external display screen is used as the screen projection device. As the current refresh rate exceeds the target execution set and belongs to the standard set supported by the processor, the content to be displayed would be controlled to be processed at the current refresh rate and projected onto the screen projection device. As such, when the current refresh rate of the external display screen is higher than the highest refresh rate supported by the built-in display screen but not higher than the highest refresh rate supported by the processor, the content to be displayed and to be projected onto the screen projection device can be processed at the current refresh rate of the external display screen, which is not restricted by the current refresh rate of the built-in display screen and by the highest refresh rate supported by the built-in display screen. It can achieve the maximum performance of a high-end external display screen and improve user experience.

The above description is only an overview of the technical solution of the present application. In order to be able to have the technical features of the present application understood more clearly, the exemplary embodiments of the present application are provided below, so that the present application can be implemented according to the content of

DETAILED DESCRIPTION

In order to make the purposes, technical solutions and advantages of the embodiments of the present disclosure clearer, the technical solutions in the embodiments of the present disclosure will be described clearly and completely below with reference to the accompanying drawings of the present disclosure. Apparently, the described embodiments are just a part of the embodiments of the present disclosure, but not all of the embodiments. Based on the exemplary embodiments in the present disclosure, all other embodiments obtained by those skilled in the art without creative work fall within the protection scope of the present disclosure.

Figure 1:
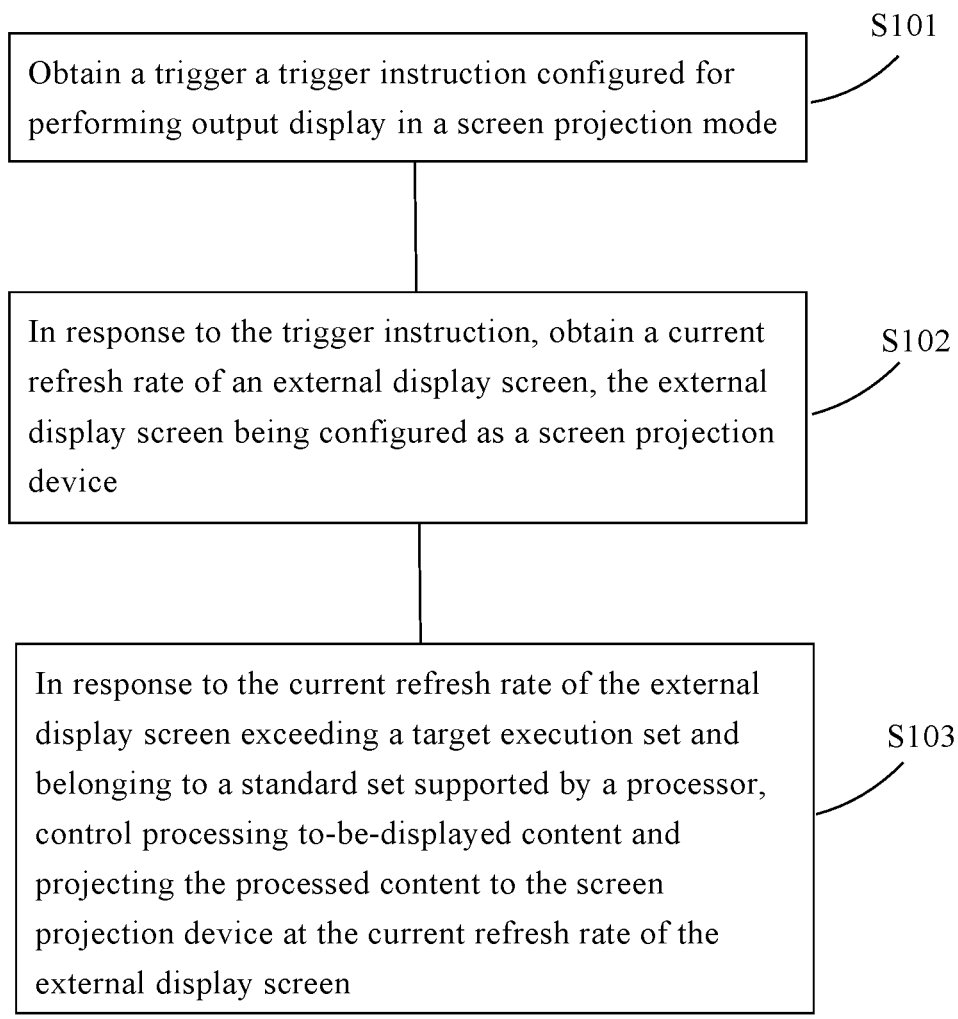
FIG. 1 is a schematic flowchart of a processing method according to an embodiment of the present disclosure.

At present, it is generally believed that the display refresh rate of an external display screen is limited by the refresh rate of the processor of a mobile terminal. However, it is actually limited by the built-in display screen integrated circuit (IC) of the mobile terminal. Due to the performance limitation of the built-in display screen IC, when setting the refresh rate of the mobile terminal, even if the highest refresh rate that the processor can support is higher, only the refresh rate supported by the built-in display screen can be used to process the content to be displayed. With the advancement of technology, mobile terminals can already support output display in a screen projection mode, that is, can display the content to be displayed through an external display screen. In response to the highest refresh rate supported by the screen projection device being higher than the highest refresh rate that the built-in display screen can support and but not higher than the highest refresh rate that the processor can support, then in this case, the highest refresh rate that the built-in display screen can support should not be a restriction that constrains the processor to set the refresh rate value for the content to be displayed, because in fact, in the projection state, the user has connected a better external display screen. To this end, an embodiment of the present disclosure provides a processing method, which can be applied to a mobile terminal with a built-in display screen. As shown in FIG. 1, the method includes but is not limited to the following steps.

In S101, a trigger instruction is obtained. The trigger instruction is used to perform output display in a screen projection mode.

In this embodiment, a user can perform a screen projection operation on the content to be displayed on the mobile terminal, so that the mobile terminal obtains the trigger instruction. Alternatively, the mobile terminal can obtain the trigger instruction by recognizing that a screen projection device is connected to the mobile terminal.

In S102, in response to the trigger instruction, the current refresh rate of the external display screen is obtained, and the external display screen is used as the screen projection device.

In this embodiment, the current refresh rate of the external display screen may be the default refresh rate of the external display screen. After the mobile terminal obtains the trigger instruction, it can obtain the current refresh rate of the external display screen through a wireless connection, or obtain the current refresh rate of the external display screen through a wired connection. When the current refresh rate of the external display screen is obtained through a wired connection method, the current refresh rate of the external display screen will be sent to the mobile terminal device through an interface protocol when the external display screen is connected to the mobile terminal for the first time.

In S103, in response to the current refresh rate of the external display screen exceeding a target execution set and belonging to a standard set supported by the processor of the mobile terminal, a control is executed to process the content to be displayed at the current refresh rate of the external display screen and to project the content onto the screen projection device (i.e., the external display screen).

In this embodiment, the target execution set is a refresh rate range of the built-in display screen. The processor may be a central processing unit (CPU) or a graphics processing unit (GPU). The standard set is a refresh rate range supported by the processor.

If the current refresh rate of the external display screen does not exceed the target execution set, the performance of the external display may not be better than that of the built-in display screen. Therefore, the mobile terminal can directly use the target execution set to perform the projection of the to-be-displayed content to the connected screen projection device.

In response to the current refresh rate of the external display screen exceeding the target execution set and belonging to the standard set supported by the processor, it indicates that the performance of the external display screen is higher than that of the built-in display screen, and the default refresh rate of the external display screen is within the refresh rate range of the processor. The highest refresh rate that the built-in display screen can support should not be a restriction that constrains the processor to set the refresh rate value for the content to be displayed. At this time, it is necessary to release the restriction on the refresh rate of the mobile terminal, and the content to be displayed can be processed at the current refresh rate of the external display screen. Then the content to be displayed is projected to the screen projection device, so that a high refresh rate can be used in the case of screen projection, and a user can enjoy the high-end experience brought by a high-end external display screen.

In response to the current refresh rate of the external display screen exceeding the standard set supported by the processor, it indicates that the performance of the external display screen is so good such that the processor cannot support the current refresh rate of the external display screen. In such case, the content to be displayed can be processed and projected to the screen projection device according to the highest refresh rate supported by the processor. Alternatively, the target execution set can be executed to perform the projection of the to-be-displayed content to the connected screen projection device.

In the process of controlling the projection of the to-be-displayed content to the screen projection device according to the current refresh rate of the external display screen, a message can be prompted so that the user can be reminded of possible impacts, e.g., increased power consumption.

In the processing method provided by this embodiment of the present disclosure, when the output display is performed in the screen projection mode, the current refresh rate of the external display screen is obtained, and the external display screen is used as a screen projection device. In response to the current refresh rate of the external display screen exceeding the target execution set and belonging to the standard set supported by the processor. A control is executed by the processor to process the to-be-displayed content and to project the to-be-displayed content to the screen projection device according to the current refresh rate of the external display screen. When the current refresh rate of the external display is higher than the highest supported refresh rate of the built-in display screen and not higher than the highest refresh rate supported by the processor, the to-be-displayed content that needs to be projected to the screen projection device can be processed according to the current refresh rate of the external display screen, which is not limited by the current refresh rate of the built-in display screen and the highest supported refresh rate of the built-in display screen. This can achieve the maximum performance of a high-end external display screen and improve user experience.

Figure 1A:
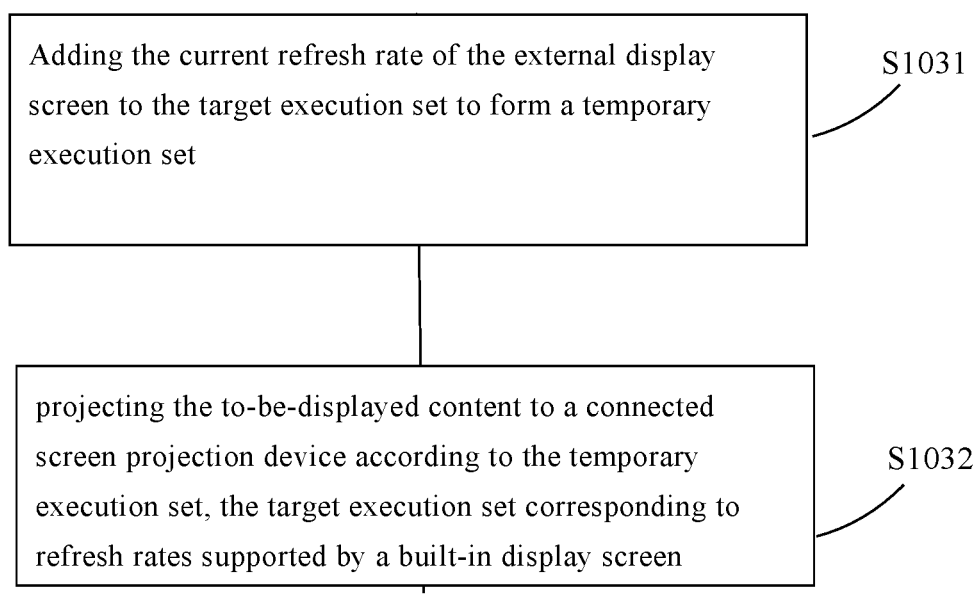
FIG. 1A is another schematic flowchart of the processing method according to an embodiment of the present disclosure.

In an optional embodiment, in S103, as shown in FIG. 1A, the executing a control to process the content to be displayed using the current refresh rate of the external display screen and to project the processed content to the projection device, includes: adding the current refresh rate of the external display screen to the target execution set to form a temporary execution set (S1301); and projecting the to-be-displayed content to the connected projection device using the temporary execution set (S1302). The target execution set corresponds to the refresh rates supported by the built-in display screen.

Specifically, for the operating system of a mobile terminal, there have different types of operating systems. In response to the selection strategy of an operating system for the refresh rate of the external display screen being that it cannot select a refresh rate higher than the current refresh rate of the built-in display screen, e.g., the Android system, the current refresh rate of the external display screen needs to be added to the target execution set to form a temporary set. That is, the current refresh rate of the external display screen needs to be superimposed into the refresh rate range of the built-in display screen, so that the refresh rate of the external display screen can be recognized by the processor as a refresh rate that the built-in display screen can support. Then, the content to be displayed is processed at the current refresh rate in the temporary set, and is projected to the screen projection device. When the temporary execution set is formed, instead of being distinguished from the target execution set and formed a set parallel to the target execution set, the current refresh rate of the external display screen is added to the target execution set, and the new set formed is the temporary execution set.

In this embodiment, a temporary execution set is formed by adding the current refresh rate of the external display screen to the target execution set, so that the refresh rate of the external display screen is superimposed into the refresh rate range of the built-in display screen. The refresh rate of the external display screen can be recognized by the processor as a refresh rate that the built-in display screen can support, so that the content to be displayed can be processed at the current refresh rate of the external display screen. In this way, when the selection strategy of an operating system for the refresh rate of the external display is that it cannot select a display mode that is higher than the current refresh rate of the built-in display screen, the operating system can still select a display mode that is higher than the current refresh rate of the built-in display screen.

In an optional embodiment, the current refresh rate of the external display screen exceeds the target execution set, that is, the current refresh rate of the external display screen is higher than the highest refresh rate supported by the built-in display screen. Therefore, when the control is performed to process the content to be displayed at the current refresh rate of the external display screen and to project the content to the screen projection device, if the built-in display screen also displays the content to be displayed at the same time, it is likely to cause the content displayed on the built-in display screen to be stuck, confused or lost. For example, the upper part of the built-in display screen may display the image content of a current frame, and the lower part of the built-in display screen may display the image content of a previous frame. The processing method therefor includes: during controlling the process of processing the content to be displayed at the current refresh of the external display screen and of projecting the content to the screen projection device, in response to the built-in display being in an on state, the display of the built-in display screen is controlled to turn off.

Specifically, since the user has connected a better external display screen to display the content to be displayed, during controlling the process of processing the content to be displayed at the current refresh rate of the external display screen and of projecting the content to the screen projection device, the built-in display state of the built-in display screen can be checked. When it is detected that the built-in display is on, the display of the built-in display screen is turned off, so that the content to be displayed is not displayed on the built-in display screen, thereby avoiding the content displayed on the built-in display screen from being stuck, confusing and loss, etc.

Certainly, in this embodiment, only the display of the built-in display screen is controlled to be turned off, but the touch screen functions of the built-in display screen are still available. For example, when the user needs to change the content displayed on the screen projection device, the user can touch the function of the corresponding position of the built-in display screen to realize the replacement of the content displayed on the screen projection device.

In an optional embodiment, the current refresh rate of the external display screen exceeds the target execution set, that is, the current refresh rate of the external display screen is higher than the highest refresh rate supported by the built-in display screen. Therefore, when the control is performed to process the content to be displayed at the current refresh rate of the external display screen and to project the content to the screen projection device, in response to the built-in display screen also displaying the content to be displayed at the same time, it is likely to cause the content displayed on the built-in display screen to be stuck, confused or lost. For example, the upper part of the built-in display screen may display the image content of a current frame, and the lower part of the built-in display screen may display the image content of a previous frame. The processing method therefor includes: during controlling the process of processing the content to be displayed at the current refresh of the external display screen and of projecting the content to the screen projection device, in response to the built-in display being in an on state, the display of the built-in display screen is controlled to turn off; and if there is a connected external input device, the touch screen functions of the built-in display screen is also controlled to turn off.

Specifically, since the user has connected a better external display screen to display the content to be displayed, during controlling the process of processing the content to be displayed at the current refresh rate of the external display screen and of projecting the content to the screen projection device, the built-in display state of the built-in display screen can be checked. When it is detected that the built-in display is on, the display of the built-in display screen is turned off, so that the content to be displayed is not displayed on the built-in display screen, thereby avoiding the content displayed on the built-in display screen from being stuck, confusing and loss, etc. Further, it is also possible to detect whether the mobile terminal is connected to an external input device. The external input device may be a mouse or the like. In response to the mobile terminal being connected with an external input device, the user can control the functions of the mobile terminal through the external input device, and can turn off the touch function of the built-in display screen. For example, when the user needs to replace the content displayed on the screen projection device, the displayed content can be replaced through an external input device, so as to realize the replacement of the content displayed on the screen projection device.

In an optional embodiment, the processing method includes: in response to the screen projection to the screen projection device being a mirror projection, during controlling to process the content to be displayed at the current refresh rate of the external display screen and to project the content to the screen projection device, in response to the built-in display screen being unable to output synchronously, controlling to turn off the display of the built-in display screen.

Specifically, if it is detected that the screen projection to the screen projection device is a mirror projection, the built-in display screen and the external display screen simultaneously display the content to be displayed. If the driver of the built-in display screen determines that the built-in display screen can support refreshing at a refresh rate exceeding the highest refresh rate that the built-in display screen can support, the built-in display screen needs to ensure that the normal display cannot be affected, and the built-in display screen can be controlled within the highest refresh rate that the built-in display screen can support for refreshing the content displayed on the built-in display screen. At this time, although the normal display is not affected, since the content displayed on the external display is refreshed at the current refresh rate of the external display screen, the content displayed on the external display screen may not be synchronized with the content displayed on the built-in display screen. Therefore, when it is detected that the built-in display screen cannot output synchronously, the display of the built-in display screen can be turned off.

If the driver of the built-in display screen determines that the built-in display screen cannot support refreshing at the refresh rate exceeding the highest refresh rate that the built-in display screen can support, the built-in display cannot be displayed synchronously, and the display of the built-in display can also be turned off.

In the embodiment of the present disclosure, when the screen projection to the screen projection device is a mirror projection, the output of the built-in display screen is synchronously detected. If the built-in display screen cannot output synchronously, the display of the built-in display screen is controlled to be turned off, which can avoid the problem that the output of the built-in display screen is not synchronized to cause the content seen by the user to be out of synchronization.

In an optional embodiment, the processing method further includes: in response to the external display screen being disconnected, deleting the current refresh rate of the external display screen from the temporary execution set. Alternatively, when it is obtained that the output display in the screen projection mode is exited, the current refresh rate of the external display screen is then deleted from the temporary execution set.

Specifically, in response to the external display screen being suddenly disconnected from the mobile terminal, or the user no longer needs to perform the screen projection and exits the output display in the screen projection mode, then it is no longer the screen projection state at this time, and the current refresh rate can be deleted from the temporary execution set to restore the original target execution set.

When the current refresh rate is deleted from the temporary execution set, the mobile terminal will record the identification of the external display screen and the current refresh rate, so that when the external display screen is connected again, it is no longer necessary to obtain the current refresh rate of the external display screen, and this current refresh rate recorded is directly added to the target execution set.

In this embodiment, when it is detected that the external display screen is disconnected or when it is obtained that the output display in a screen projection mode is exited, the mobile terminal is then not connected to a high-performance external display screen. The current refresh rate can be deleted from the temporary execution set, so that the processor can select a current refresh rate according to the refresh rate range of the built-in display screen, and the built-in display screen can display normally.

In an optional embodiment, the processing method further includes: obtaining a refresh rate set of the external display screen; and adding the refresh rate set of the external display screen to the target execution set based on the standard set supported by the processor. As such, during the control of processing the to-be-displayed content at the current refresh rate and of projecting the content to the screen projection device, if it is obtained that the current refresh rate of the external display screen is switched to another refresh rate (e.g., a second refresh rate), the content to be displayed is processed and projected to the screen projection device using another refresh rate. Another refresh rate exceeds the target execution set and belongs to the standard set supported by the processor.

Specifically, in addition to obtaining the current refresh rate of the external display screen, a refresh rate set enumerated by the external display screen can also be obtained, where the refresh rate set includes the current refresh rate of the external display screen. Since the refresh rate set of the external display screen may include refresh rates that cannot be supported by the processor, it is necessary to filter the refresh rate set of the external display screen based on the standard set supported by the processor. The filtered refresh rate set is then added to the target execution set.

When filtering the refresh rate set, factors e.g., the current power of the mobile terminal, ambient light, etc. may also be considered to remove the refresh rates that cannot be applied in the current environment, such that the applicable refresh rates can be retained.

After the filtered refresh rate set is added to the target execution set, the formed temporary execution set can be further filtered. The refresh rate values in the formed temporary execution set can be reprocessed to obtain a final temporary execution set. In this way, each refresh rate value also corresponds to a unique display mode.

When the user needs to switch the current refresh rate to another refresh rate, the user can select a refresh rate provided by the external display screen from the temporary execution set. The selected refresh rate exceeds the target execution set and belongs to the standard set supported by the processor.

In this embodiment, by obtaining the refresh rate set of the external display screen, the refresh rate set of the external display screen is added to the target execution set based on the standard set supported by the processor, so that the user can select the refresh rate values exceeding the target execution set and belonging to the standard set supported by the processor, thereby improving the user experience.

Figure 2:
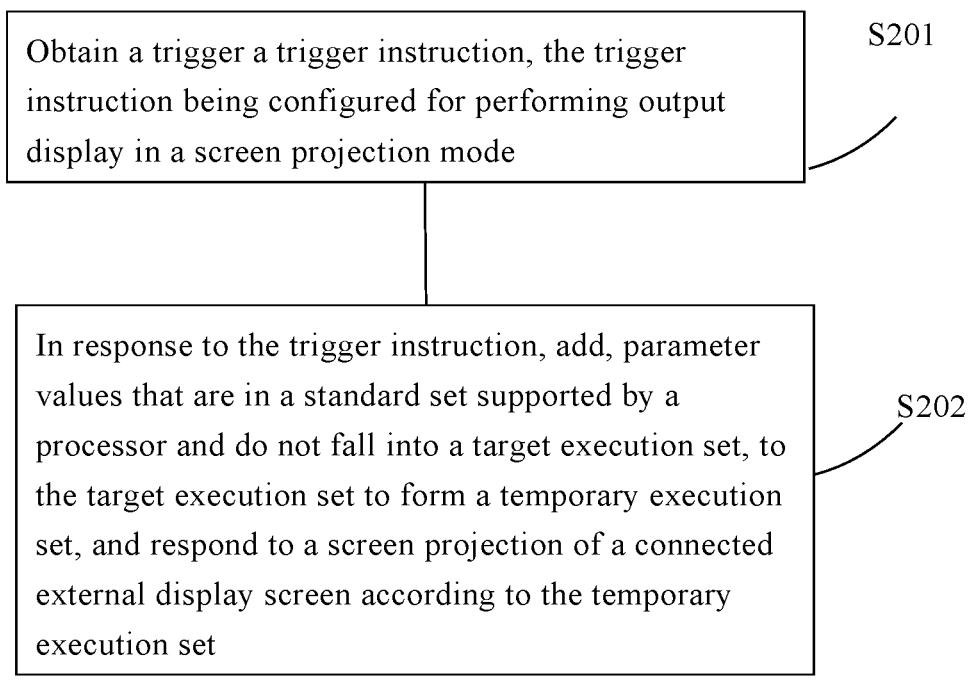
FIG. 2 is a schematic flowchart of another processing method according to an embodiment of the present disclosure.

An embodiment of the present disclosure provides another processing method, which can be applied to a mobile terminal with a built-in display screen. As shown in FIG. 2, the processing method includes, but is not limited to the following steps.

In S201, a trigger instruction is obtained. The trigger instruction is used to perform output display in a screen projection mode.

In this embodiment, a user can perform a screen projection operation on the content to be displayed on the mobile terminal, so that the mobile terminal obtains the trigger instruction. Alternatively, the mobile terminal can obtain the trigger instruction by recognizing that a screen projection device is connected to the mobile terminal.

In S202, in response to the trigger instruction, parameter values that are not in the target execution set but in the standard set supported by the processor are added into the target execution set to form a temporary execution set. The screen projection display of the connected external display screen corresponds with the temporary execution set.

In this embodiment, the target execution set is a refresh rate range of the built-in display screen. The processor may be a CPU or a graphics processing unit (GPU). The standard set is a refresh rate range of the processor. The parameter values are the refresh rate values. The external display screen is used as a projection device.

Due to the limitation of the built-in display screen IC, the highest refresh rate supported by the processor is often higher than the highest refresh rate supported by the built-in display screen. Therefore, the standard set supported by the processor is larger than the target execution set. When the output display is performed in a screen projection mode, the mobile terminal is connected to a better-performance external display screen at this time. Therefore, it is necessary to release the restriction on the processing of the to-be-displayed content by the mobile terminal according to the target execution set, and the parameter values that are in the standard set supported by the processor but do not fall into the target execution set can be added to the target execution set to form a temporary execution set. As such, the refresh rate of the standard set supported by the processor that does not fall into the target execution set can be recognized by the processor as the refresh rates supported by the built-in display screen. Then, the to-be-displayed content can be processed at a refresh rate in the temporary execution set that does not fall into the target execution set, and can then be projected to the screen projection device.

In the processing method provided by the embodiment of the present disclosure, when the output display is performed in a screen projection mode, parameter values in the standard set supported by the processor that are not included in the target execution set are added to the target execution set to form a temporary execution set. The screen projection display of the connected external display can correspond to the temporary execution set. When the highest refresh rate supported by the external display is higher than the highest refresh rate supported by the built-in display screen, it can be executed as the processor can support higher than the target. The to-be-displayed content that needs to be projected to the screen projection device can be processed at a refresh rate that is supported by the processor but is higher than the refresh rates in the target execution set. It is not limited by the current refresh rate of the built-in display screen and the highest refresh rate supported by the built-in display screen, which can achieve the maximum performance of a high-end external display screen and improve user experience.

Figure 3:
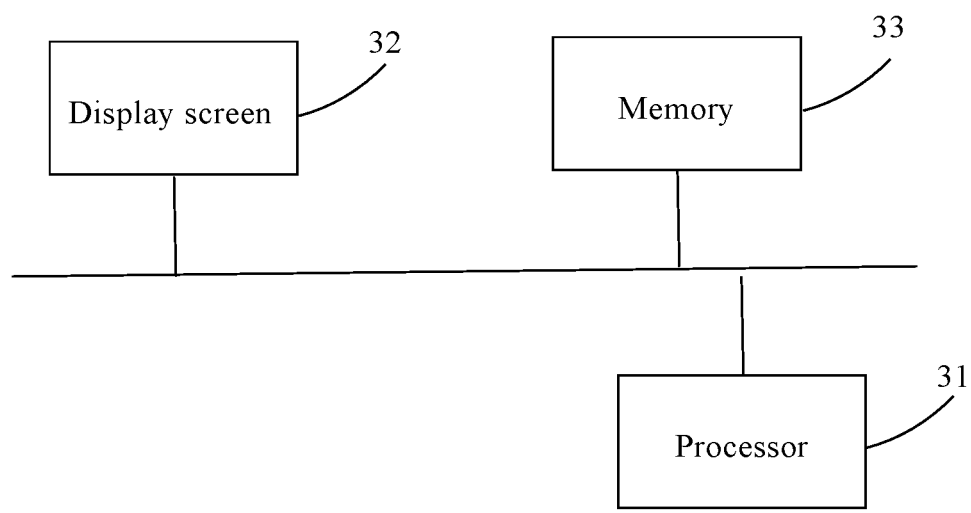
FIG. 3 is a schematic diagram of a hardware structure of an electronic device according to an embodiment of the present disclosure.

Based on the same inventive concept as the processing methods in the foregoing embodiments, an embodiment of the present disclosure further provides an electronic device, as shown in FIG. 3. The electronic device includes: a processor 31 and a display screen 32. The processor 31 is configured to obtain a trigger instruction. The trigger instruction is used to perform an output display in a screen projection mode. The processor 31 is further configured to obtain a current refresh rate of the external display screen in response to the trigger instruction. The external display screen is used as a screen projection device. In response to the current refresh rate exceeding the target execution set and in the standard set supported by the processor, the processor 31 is further configured to perform controls to process the content to be displayed at the current refresh rate and to project the content to the screen projection device.

The display screen 32 is used as an input and output device, and is a built-in display screen of the electronic device. The display screen 32 can be a CRT (cathode ray tube) display screen, an LCD (liquid crystal) display screen, a PDP (plasma) display screen, an OLED (light emitting diode surface light source) display screen, and the like.

The processor 31 may be a central processing unit (Central Processing Unit, CPU). The processor 31 may also be other general-purpose processors, digital signal processors (Digital Signal Processor, DSP), application specific integrated circuits (Application Specific Integrated Circuit, ASIC), Field-Programmable Gate Arrays (Field-Programmable Gate Array, FPGA) or other programmable logic devices, discrete gate or transistor logic devices, discrete hardware components and other chips, or a combination of the above various types of chips.

In an optional embodiment, the electronic device may further include a memory 33.

The memory 33 can be a non-transitory computer readable medium that is configured to store non-transitory software programs, non-transitory computer-executable programs and modules, e.g., program instructions/modules corresponding to the processing methods in the embodiments of the present disclosure. The processor 31 can execute various functional applications and data processing by running the non-transitory software programs, instructions and modules stored in the memory 33, i.e., the processor 31 can implement the processing methods in the above embodiments.

The memory 33 may include a program storage rea and a data storage area. The program storage area may store an operating system and at least an application program required by functions; and the data storage area may store data created by the processor 31 and the like. Additionally, the memory 33 may include high-speed random access memory, and may also include non-transitory memory, e.g., at least one magnetic disk storage device, a flash memory device, or other non-transitory solid-state storage devices. In some embodiments, the memory 33 may optionally include memories located remotely from the processor 31, and these remote memories may be connected to the processor 31 via a network. Examples of such networks include, but are not limited to, the Internet, an intranet, a local area network, a mobile communication network, and combinations thereof.

The one or more modules described above are stored in the memory 33. When the one or more modules are executed by the processor 31, the processing method in the embodiment shown in FIG. 1 can be executed.

The specific details of the above electronic device can be understood by referring to the corresponding description and effects in the embodiment shown in FIG. 1, and details are not repeated herein.

In an optional embodiment, the step of executing a control to process the content to be displayed using the current refresh rate of the external display screen and to project the processed content to the projection device, includes: adding the current refresh rate of the external display screen to the target execution set to form a temporary execution set; and projecting the to-be-displayed content to the connected projection device using the temporary execution set. The target execution set corresponds to the refresh rates supported by the built-in display screen.

Specifically, for the operating system of a mobile terminal, there have different types of operating systems. In response to the selection strategy of an operating system for the refresh rate of the external display screen being that it cannot select a refresh rate higher than the current refresh rate of the built-in display screen, e.g., the Android system, the current refresh rate of the external display screen needs to be added to the target execution set to form a temporary set. That is, the current refresh rate of the external display screen needs to be superimposed into the refresh rate range of the built-in display screen, so that the refresh rate of the external display screen can be recognized by the processor as a refresh rate that the built-in display screen can support. Then, the content to be displayed is processed at the current refresh rate in the temporary set, and is projected to the screen projection device. When the temporary execution set is formed, instead of being distinguished from the target execution set and formed a set parallel to the target execution set, the current refresh rate of the external display screen is added to the target execution set, and the new set formed is the temporary execution set.

In this embodiment, a temporary execution set is formed by adding the current refresh rate of the external display screen to the target execution set, so that the refresh rate of the external display screen is superimposed into the refresh rate range of the built-in display screen. The refresh rate of the external display screen can be recognized by the processor as a refresh rate that the built-in display screen can support, so that the content to be displayed can be processed at the current refresh rate of the external display screen. In this way, when the selection strategy of an operating system for the refresh rate of the external display is that it cannot select a display mode that is higher than the current refresh rate of the built-in display screen, the operating system can still select a display mode that is higher than the current refresh rate of the built-in display screen.

Based on the same concept as the processing method in the foregoing embodiment, an embodiment of the present disclosure further provides another electronic device, as shown in FIG. 3. The electronic device includes: a processor 31 and a display screen 32. The processor 31 is configured to obtain a trigger instruction. The trigger instruction is used for performing output display in a screen projection mode. The processor 31 is further configured to, in response to the trigger instruction, add the parameter values in the standard set supported by the processor that do not fall into the target execution set to the target execution set to form a temporary execution set. The processor 31 is further configured to respond to the screen projection display of the connected external display according to the temporary execution set.

In an optional embodiment, the electronic device may further include a memory 33.

The specific details of the above electronic device can be understood by referring to the embodiment shown in FIG. 2 and the corresponding descriptions and effects of the foregoing electronic device embodiments of the present disclosure, and details are not repeated herein.

Those skilled in the art can understand that all or part of the processes in the methods of the above embodiments can be completed by instructing relevant hardware through a computer program. The program can be stored in a computer-readable storage medium. When executing the program, the processes in the embodiments of the above-mentioned methods may be included. The storage medium may be a magnetic disk, an optical disk, a read-only memory (Read-Only Memory, ROM), a random access memory (Random Access Memory, RAM), a flash memory (Flash Memory), a hard disk (Hard Disk Drive, abbreviation: HDD) or solid-state drive (Solid-State Drive, SSD), and the like. The storage medium may also include a combination of the above-mentioned types of memories.

As appreciated by those skilled in the art, the embodiments of the present disclosure may be provided as methods, systems, or computer program products. Accordingly, the embodiments of the present disclosure may be implemented entirely by hardware, software, or combinations of software and hardware. Furthermore, the present disclosure may include a computer program product embodied on one or more computer-usable storage media (including, but not limited to, disk storage, CD-ROM, optical storage, etc.) having computer-usable program code embodied therein.

The present disclosure is described with reference to flowcharts and/or block diagrams of methods, apparatus (systems), and computer program products according to embodiments of the present disclosure. It will be understood that each step and/or block in the flowcharts and/or block diagrams, and combinations of steps and/or blocks in the flowcharts and/or block diagrams, can be implemented by computer program instructions. These computer program instructions may be provided to the processor of a general purpose computer, a special purpose computer, an embedded processor or other programmable information processing device to produce a machine, such that the instructions executed by the processor of the computer or other programmable information processing device produce an apparatus for implementing the functions specified in one or more steps of the flowcharts and/or one or more blocks of the block diagrams.

These computer program instructions may also be stored in a computer-readable memory capable of directing a computer or other programmable information processing device to function in a particular manner, such that the instructions stored in the computer-readable memory result in an article of manufacture comprising an instruction apparatus. The instruction apparatus implements the functions specified in one or more steps of the flowcharts and/or one or more blocks of the block diagrams.

These computer program instructions can also be loaded on a computer or other programmable information processing device to cause a series of operational steps to be performed on the computer or other programmable device to produce a computer-implemented process. As such, the instructions executable on the computer or other programmable information processing device can provide steps for implementing the functions specified in one or more steps of the flowcharts and/or one or more blocks of the block diagrams.

Apparently, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A processing method, comprising:
    obtaining a trigger instruction, the trigger instruction being configured for performing output display in a screen projection mode;
    in response to the trigger instruction, obtaining a current refresh rate of an external display screen, the external display screen being configured as a screen projection device; and
    in response to the current refresh rate of the external display screen exceeding a target execution set and belonging to a standard set supported by a processor, controlling processing to-be-displayed content and projecting the processed content to the screen projection device at the current refresh rate of the external display screen, by:
    adding the current refresh rate of the external display screen to the target execution set to form a temporary execution set; and
    projecting the to-be-displayed content to a connected screen projection device according to the temporary execution set;
    wherein the target execution set corresponds to refresh rates supported by a built-in display screen.

2. The processing method according to claim 1, further comprising:
    in controlling processing the to-be-displayed content and projecting the processed content to the screen projection device at the current refresh rate of the external display screen, and in response to the built-in display screen being in a lit state, controlling display of the built-in display screen to be turned off; or
    in controlling processing the to-be-displayed content and projecting the processed content to the screen projection device at the current refresh rate of the external display screen, and in response to the built-in display screen being in a lit state, controlling display of the built-in display screen to be turned off; and in response to an external input device being connected, controlling a touch function of the built-in display screen to be turned off.

3. The processing method according to claim 1, further comprising:
    in response to the screen projection projected to the screen projection device being a mirror screen projection, in controlling processing the to-be-displayed content and projecting the processed content to the screen projection device at the current refresh rate of the external display screen, and in response to the built-in display screen being unable to output synchronously, controlling display of the built-in display screen to be turned off.

4. The processing method of claim 1, further comprising:
    in response to the external display screen being disconnected, deleting the current refresh rate of the external display screen from the temporary execution set; or
    in response to an exit of performing the output display in the screen projection mode being obtained, deleting the current refresh rate of the external display screen from the temporary execution set.

5. The processing method of claim 1, further comprising:
    obtaining a refresh rate set of the external display screen;
    adding the refresh rate set of the external display screen to the target execution set based on the standard set supported by the processor; and
    in controlling processing the to-be-displayed content and projecting the processed content to the screen projection device at the current refresh rate of the external display screen, when it is obtained that the current refresh rate of the external display screen is switched to another refresh rate, processing and projecting the to-be-displayed content to the screen projection device according to the another refresh rate,
    wherein the another refresh rate exceeds the target execution set and belongs to the standard set supported by the processor.

6. A processing method, comprising:
    obtaining a trigger instruction, the trigger instruction being configured for performing output display in a screen projection mode;
    in response to the trigger instruction, adding, parameter values that are in a standard set supported by a processor and do not fall in a target execution set, to the target execution set to form a temporary execution set;
    responding to a screen projection of a connected external display screen according to the temporary execution set; and
    in response to the trigger instruction, obtaining a current refresh rate of the external display screen, the external display screen being configured as a screen projection device; and
    in response to the current refresh rate of the external display screen being in the temporary execution set, controlling processing to-be-displayed content and projecting the processed content to the screen projection device at the current refresh rate of the external display screen.

7. The processing method according to claim 6, further comprising:
    in controlling processing the to-be-displayed content and projecting the processed content to the screen projection device at the current refresh rate of the external display screen, and in response to the built-in display screen being in a lit state, controlling display of the built-in display screen to be turned off; or
    in controlling processing the to-be-displayed content and projecting the processed content to the screen projection device at the current refresh rate of the external display screen, in response to the built-in display screen being in a lit state, controlling display of the built-in display screen to be turned off; and in response to an external input device being connected, controlling touch function of the built-in display screen to be turned off.

8. The processing method according to claim 6, further comprising:
in response to the screen projection projected to the screen projection device being a mirror screen projection, in controlling processing the to-be-displayed content and projecting the processed content to the screen projection device at the current refresh rate of the external display screen, and in response to the built-in display screen being unable to output synchronously, controlling display of the built-in display screen to be turned off.

9. The processing method of claim 6, further comprising:
in response to the external display screen being disconnected, deleting the current refresh rate of the external display screen from the temporary execution set; or
in response to an exit of performing the output display in the screen projection mode being obtained, deleting the current refresh rate of the external display screen from the temporary execution set.

10. The processing method of claim 6, further comprising:
obtaining a refresh rate set of the external display screen;
adding the refresh rate set of the external display screen to the target execution set based on the standard set supported by the processor; and
in controlling processing the to-be-displayed content and projecting the processed content to the screen projection device at the current refresh rate of the external display screen, when it is obtained that the current refresh rate of the external display screen is switched to another refresh rate, processing and projecting the to-be-displayed content to the screen projection device according to the another refresh rate,
wherein the another refresh rate exceeds the target execution set and belongs to the standard set supported by the processor.

11. An electronic device comprising:
a display screen; and
a processor, wherein the processor is configured to:
obtain a trigger instruction, the trigger instruction being configured for performing output display in a screen projection mode;
in response to the trigger instruction, obtain a current refresh rate of an external display screen, the external display screen being configured as a screen projection device; and
in response to the current refresh rate exceeding a target execution set and belonging to a standard set supported by the processor, control processing to-be-displayed content and projecting the processed content to the screen projection device according to the current refresh rate,
add the current refresh rate of the external display screen to the target execution set to form a temporary execution set; and
project the to-be-displayed content to a connected screen projection device according to the temporary execution set;
wherein the target execution set corresponds to refresh rates supported by a built-in display screen.

12. The electronic device according to claim 11, wherein, for controlling processing the to-be-displayed content and projecting the processed content to the screen projection device at the current refresh rate of the external display screen, in response to the built-in display screen being in a lit state, the processor is further configured to:
control display of the built-in display screen to be turned off; or
control display of the built-in display screen to be turned off; and in response to an external input device is connected, the processor is further configured to control touch function of the built-in display screen to be turned off.

13. The electronic device according to claim 11, wherein:
in response to the screen projection projected to the screen projection device being a mirror screen projection, for controlling processing the to-be-displayed content and projecting the processed content to the screen projection device at the current refresh rate of the external display screen, and in response to the built-in display screen being unable to output synchronously, the processor is further configured to control display of the built-in display screen to be turned off.

14. The electronic device according to claim 11, wherein:
in response to the external display screen being disconnected, the processor is further configured to delete the current refresh rate of the external display screen from the temporary execution set; or,
in response to an exit of performing the output display in the screen projection mode being obtained, the processor is further configured to delete the current refresh rate of the external display screen from the temporary execution set.

15. The electronic device according to claim 11, wherein the processor is further configured to:
obtain a refresh rate set of the external display screen;
add the refresh rate set of the external display screen to the target execution set based on the standard set supported by the processor; and
in controlling processing the to-be-displayed content and projecting the processed content to the screen projection device at the current refresh rate of the external display screen, if it is obtained that the current refresh rate of the external display screen is switched to another refresh rate, process and project the to-be-displayed content to the screen projection device according to the another refresh rate,
wherein the another refresh rate exceeds the target execution set and belongs to the standard set supported by the processor.

\* \* \* \* \*